(12) United States Patent
Bohin et al.

(10) Patent No.: US 6,562,737 B1
(45) Date of Patent: May 13, 2003

(54) SILICON COMPOSITION FOR COATING SUBSTRATES IN SUPPLE MATERIAL, IN PARTICULAR TEXTILE

(75) Inventors: Fabrice Bohin, Lyons (FR); Bernard Dalbe, Lyons (FR); Laurent Dumont, La Motte Servolex (FR); Jens Heilmann, Lubeck (DE); Uwe Kaiser, Moorrege (DE); Alain Pouchelon, Meyzieu (FR); Christian Pusineri, Serezin du Rhone (FR); Joachim Walz, Lubeck (DE)

(73) Assignee: Rhodia Chimie, Courbevoie Cedex (FR)

( * ) Notice: Subject to any disclaimer, the term of this patent is extended or adjusted under 35 U.S.C. 154(b) by 0 days.

(21) Appl. No.: 09/462,378

(22) PCT Filed: Jul. 8, 1998

(86) PCT No.: PCT/FR98/01469

§ 371 (c)(1),
(2), (4) Date: May 23, 2000

(87) PCT Pub. No.: WO99/02592

PCT Pub. Date: Jan. 21, 1999

(30) Foreign Application Priority Data

Jul. 9, 1997 (FR) .............................................. 97 08976

(51) Int. Cl.$^7$ ................................................. B32B 5/02
(52) U.S. Cl. .................... 442/59; 428/368; 428/391; 428/36.1; 428/36.6; 528/15; 528/31; 524/783; 524/785; 524/862; 525/478; 280/728.1
(58) Field of Search ............................... 428/36.1, 36.6, 428/447, 423.5, 423.7; 442/59; 528/15, 31; 524/862, 783, 785, 779, 780; 525/478; 280/728.1

(56) References Cited

U.S. PATENT DOCUMENTS

| | | | | | |
|---|---|---|---|---|---|
| 3,615,972 | A | * | 10/1971 | Morehouse et al. | ........... 156/79 |
| 4,719,249 | A | * | 1/1988 | Dietlein et al. | ............. 523/179 |
| 5,246,973 | A | * | 9/1993 | Nakamura et al. | ............ 521/54 |
| 5,269,298 | A |   | 12/1993 | Adams et al. | |
| 5,298,317 | A |   | 3/1994 | Takahashi et al. | |
| 6,101,636 | A | * | 8/2000 | Williams | ........................ 2/410 |
| 6,194,476 | B1 | * | 2/2001 | De Ridder et al. | ........... 521/54 |

FOREIGN PATENT DOCUMENTS

| | | |
|---|---|---|
| EP | 0 486 080 | 5/1992 |
| EP | 0 733 672 | 3/1995 |
| EP | 0 681 014 | 11/1995 |
| EP | 0 722 989 | 7/1996 |
| EP | 0 764 702 | 3/1997 |

* cited by examiner

*Primary Examiner*—Robert Dawson
*Assistant Examiner*—Christopher M Keehan
(74) *Attorney, Agent, or Firm*—Burns, Doane, Swecker & Mathis, L.L.P.

(57) ABSTRACT

The invention concerns a coating composition capable of being cold vulcanised (EVF), characterised in that it comprises, in a mixture: (1) at least one polyorganosiloxane having, per molecule, at least two $C_2$–$C_6$ alkenyl groups bound to silicon; (2) at least one polyorganosiloxane having, per molecule, at least two hydrogen atoms bound to silicon; (3) a catalytically effective amount of at least one catalyst, consisting of at least one metal belonging to the platinum group; (4) an adherence promoter; (5) optionally a reinforcing system which can be at least a polyorganosiloxane resin and/or a reinforcing filler; (6) optionally at least one cross-linkage inhibitor; (7) and mineral or organic hollow microspheres.

27 Claims, No Drawings

SILICON COMPOSITION FOR COATING SUBSTRATES IN SUPPLE MATERIAL, IN PARTICULAR TEXTILE

The general field of the invention is that of cold-curing silicone compositions, in particular those of the two-component type (RTV II), which crosslink by hydrosilylation or polyaddition in order to produce a thin-film elastomer. These crosslinked compositions are, among others, suitable as a coating, for example for protection or for mechanical reinforcement, on various substrates made of flexible, in particular textile, material, such as woven, knitted or non-woven fibrous substrates, for example.

Such silicone coatings are generally obtained by coating the substrate, followed by curing, which proceeds by the polyaddition of unsaturated (alkenyl, e.g. Vi—Si) groups of one polyorganosiloxane onto hydrogens of the same or of another polyorganosiloxane.

These silicone compositions have found a major outlet in the coating of flexible—woven, knitted or non-woven—materials used for the manufacture of bags for the individual protection of the occupants of vehicles, also called airbags.

For more details about airbags, reference may be made, in particular, to French Patent FR-A-2,668,106.

The present invention also relates to the application of the silicones, e.g. (RTV II), in the manufacture of such airbags.

Conventionally, the latter are formed from a fabric made of synthetic fibre, for example made of polyamide (Nylon) ®, covered on at least one of these sides with a layer of an elastomer of the chloroprene type. The presence of such a protective layer or coating is necessary because of the fact that the gases released by the gas generator (for example: carbon monoxide, $NO_x$) in the event of an impact are extremely hot and contain incandescent particles capable of damaging the Nylon® bag. The inner protective layer of elastomer must therefore be particularly resistant to high temperatures and to mechanical stresses. It is also important that this elastomer coating be in the form of a uniform thin film adhering strongly to the substrate made of synthetic fabric which forms the walls of the airbag.

Silicone compositions have easily supplanted chloroprenes in this application since it has turned out that the former better meet the impermeability requirements, even with small amounts deposited, the ageing withstand requirements (preservation of the thermal, mechanical and adhesion properties over time) and compatability with manufacturing the airbag by stitching. Compositions that can be used for a car airbag application are described especially in EP-A-0,533,840 and U.S. Pat. No. 5,296,298, as well as in EP-A-0,681,014 which proposes a formulation having improved adhesion properties.

These formulations also have two types of drawback.

The first is that the elastomer obtained may have quite a tacky feel, which, apart from the disagreeable nature of the feel, may be prejudicial to the mechanical properties and behaviour of the coated substrate. In the field of vehicle airbags, given that the value of the friction coefficient depends in particular on the ability of the bag to be deployed, an improvement would be particularly welcome.

The second is related to the constant search for as low as possible a weight of the coated fabric and for formulations allowing this, while still retaining the properties required by these applications.

The use of hollow microspheres has become widespread in the field of bulk silicone elastomers, such as the elastomers used in the fields of mammary prostheses, seals and gaskets, shock, vibration and sound absorbers, etc.

Thus, EP-A-0,722,989 proposes to increase the erosion resistance of crosslinked organosiloxane compositions used as abrasion seals between moving and stationary elements in motors and compressors, by incorporating a polyaddition composition, a reinforcing system which comprises an organosiloxane resin, finely divided quartz, heat-resistant microspheres, in particular rigid microspheres of the glass-microsphere type, or else microspheres formed from an epoxy or phenolic resin.

EP-A-0,733,672 relates to the field of silicone elastomers obtained from a room-temperature curable polyaddition two-component system generally available to the public in a single delivery device.

The objective is thus to increase the thermal resistance and reduce the cost of the two-component system, this being achieved by incorporating, into the conventional reactive-oil/catalyst composition, a filling filler formed from an elastic microsphere having an inorganic coating, for example of calcium carbonate. The choice of flexible microspheres, which are therefore not liable to be broken during their passage through the mixer of the delivery device, has made it possible to incorporate microspheres in this type of product.

Rigid or elastic microspheres have also been proposed in the field of the coating of textiles or similar substrates. However, they have been so in very special applications not related to the invention, in which the technical problems to be solved were not comparable.

Glass microspheres have thus been proposed for coating, as a thick layer (>3 mm), fabrics in the field of fire resistance. Thus, RU-A-2,039,070 proposes to coat a fabric with a silicone rubber filled with glass microspheres, by applying successive layers of a composition containing from 20 to 79.5% by weight of siloxane elastomer, from 20 to 60% by weight of glass microspheres and from 0.5 to 20% of nitride.

Moreover, patent U.S. Pat. No. 4,495,227 describes silicone compositions intended for coating fabric so as to make them water-impermeable and water-repellent while allowing them to have good air permeability and moisture permeability. These are polycondensation or polyaddition compositions which consists [sic] of reactive oils and of a corresponding catalyst. Added to these compositions are from 1 to 200 parts by weight of a foaming or blowing agent per 100 parts of crosslinkable silicone composition. Various agents have been proposed: heat-decomposable organic blowing agents such as azobisisobutyronitrile, dinitriso [sic] pentamethylene tetramine, azobisformamide; blowing agents of the microcapsule type, such as microcapsules containing a solvent based on a halogenated or non-halogenated hydrocarbon, on ether or on alcohol, for example isobutane, n-hexane, diethyl ether, methyl alcohol, methylene chloride, trichloroethane, in a polyvinylidene chloride resin sphere; or else water or alcohol microcapsules in a silicone resin. The fabric is coated with such a composition, this operation being followed by a preliminary drying step and thee a heating step, so as to crosslink the composition and, at the same time, to generate the foaming.

The objective of the present invention is to make improvements in the field of the coating of textile substrates or the like, in particular for the manufacture of vehicle airbags and most especially for reducing the friction coefficient of the crosslinked silicone elastomer with respect to the support and to allow the coating thickness on the substrate to be increased, without increasing the weight of the coated substrate, all this without prejudicing the other expected properties, or even by improving them, especially:

the fire and temperature resistance, the creasing and abrasion resistance (scrub test), the tear strength, the thermal insulation.

Another objective of the invention is to allow the cost of the coating to be reduced so as to widen the field of use of the silicone coating and thus profit from the advantageous properties of this type of coating in applications hitherto excluded from the field of application for cost reasons.

More specifically, a first subject of the present invention is a coating composition of the type of those which are cold-curing (RTV elastomers, the vulcanization or curing of which can be accelerated when they are heated), characterized in that it comprises, as a mixture:

(1) at least one polyorganosiloxane having, per molecule, at least two $C_2$–$C_6$alkenyl groups linked to the silicon, (2) at least one polyorganosiloxane having, per molecule, at least two hydrogen atoms linked to the silicon, (3) a catalytically effective amount of at least one catalyst, composed of at least one metal belonging to the platinum group, (4) an adhesion promoter, (5) optionally, a reinforcing system, which may preferably be at least one polyorganosiloxane resin, and/or at least one reinforcing filler, especially treated or untreated reinforcing silicas, (6) optionally, at least one crosslinking inhibiter, (7) organic or inorganic hollow microspheres.

The combination of microspheres and of an adhesion promoter makes it possible to achieve, in combination with the other compounds present, the desired properties thanks to strong cohesion between the various phases after crosslinking, namely the substrate, elastomer and microspheres.

The presence of a reinforcing system further improves the properties of the whole composition.

The microspheres are preferably expandable organic microspheres having a polymer wall containing a liquid or a gas. These microspheres are expanded by heating them above the softening point of the polymer and to a temperature sufficient to vaporize the liquid or suitably expand the gas which may, for example, be an alkane, such as isobutane and isopentane. The wall may consist of polymers or copolymers, for example those prepared from vinyl chloride, vinylidene chloride, acrylonitrile, methyl methacrylate or styrene monomers, or blends of polymers and/or copolymers, for example especially an acrylonitrile/methacrylonitrile copolymer or an acrylonitrile/vinylidene chloride copolymer. See especially U.S. Pat. No. 3,615,972 incorporated by reference.

They may be incorporated into the composition in the expanded state, but it will be preferred to incorporate them into the composition before their expansion, which may be induced, by suitable heating, during crosslinking of the elastomer.

It may be advantageous for the microspheres to be surface treated, as is known per se, in order to promote dispersion in the composition, especially of expandable or expanded microspheres having an inorganic coating, for example silica or salts or hydroxides of metals such as Ca, Mg, Ba, Fe, Zn, Ni, Mn, as is described for example in EP-A-486,080, or else carbonates, for example calcium carbonate.

Before their expansion, the microspheres will preferably have a diameter of between 3 and 50 μm, more particularly between 5 and 30 μm.

It will also be desirable for them to have a diameter, after expansion, between especially 10 and 150, particularly between 20 and 100 μm. In the case of mineral microspheres or microspheres already expanded, the diameter will be of the same order.

These microspheres are especially present in an amount of 1 to 30% by weight, preferably from 2 to 10% and more preferably more than 3 or 4% by weight with respect to the total composition.

The composition according to the invention is advantageously a solventless composition.

In accordance with a preferred arrangement of the invention, the adhesion promoter comprises at least one of the following compounds (4.1) and (4.2):

(4.1) at least one optionally alkoxylated organosilane containing, per molecule, at least one $C_2$–$C_6$alkenyl group, (4.2) at least one organosilicon compound which includes at least one epoxy radical, with optionally in addition:

(4.3) at least one metal M chelate and/or one metal alkoxide of general formula: $M(OJ)_n$, with n=the valency of M and J=a linear or branched $C_1$–$C_8$alkyl, M being selected from the group formed by: Ti, Zr, Ge, Li, Mn, Fe, Al and Mg, Preferably, the optionally alkoxylated organosilane (4.1) is more particularly selected from the products of the following general formula:

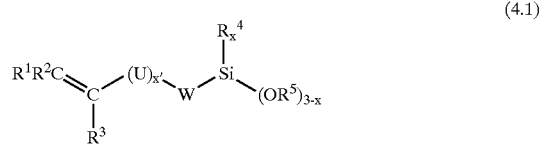

(4.1)

in which:

$R^1$, $R^2$, $R^3$ are hydrogen-containing or hydrocarbon radicals, which are the same or different from each other and represent, preferably, hydrogen, a linear or branched $C_1$–$C_4$alkyl or a phenyl optionally substituted with at least one $C_1$–$C_3$alkyl, U is a linear or branched $C_1$–$C_4$alkylene, or a divalent group of formula —CO—O-alkylene-, in which the alkylene residue has the definition given above and the right-hand free valency (in bold) is linked to the Si via W, W is a valency bond, $R^4$ and $R^5$ are radicals, which are the same or different and represent a linear or branched $C_1$–$C_4$alkyl, x'=0 or 1, and x'=0 to 2, preferably 0 or 1 and even more preferably 0.

Without this being limiting, it may be considered that vinyltrimethoxysilane or γ-(meth)-acryloxypropyltrimethoxysilane is a particularly suitable compound (4.1).

With regard to the organosilicon compound (4.2), provision is preferably made to select this:

either from the substances (4.2a) satisfying the following general formula:

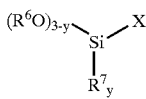
(4.2a)

in which:
R⁶ is a linear or branched $C_1$–$C_4$ alkyl radical,
R⁷ is a linear or branched alkyl radical,
y is equal to 0, 1, 2 or 3, preferably equal to 0 or 1 and even more preferably equal to 0,

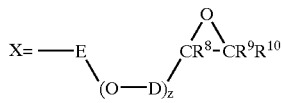

with
E and D, which are the same or different radicals, selected from linear or branched $C_1$–$C_4$ alkyls,
z, which is equal to 0 or 1,
$R^8$, $R^9$, $R^{10}$, which are the same or different radicals, representing hydrogen or a linear or branched $C_1$–$C_4$ alkyl, hydrogen being more particularly preferred,
$R^8$ and $R^9$ or $R^{10}$ which may alternately constitute together, and with the two carbons containing the epoxy, a 5-membered to 7-membered alkyl ring, or from the substances (4.2b) consisting of epoxyfunctional polydiorganosiloxanes comprising:
(i) at least one siloxyl functional unit of formula:

 (IV.2 b₁)

in which:
X is the radical as defined above in the case of formula (IV.2a)
G is a monovalent hydrocarbon group, free of any action unfavourable to the activity of the catalyst and selected, preferably, from the alkyl groups having from 1 to 8 carbon atoms inclusive, optionally substituted by at least one halogen atom, advantageously, from methyl, ethyl, propyl and 3,3,3-trifluoropropyl groups, and as well as from aryl groups, and, advantageously, from xylyl, tolyl and phenyl radicals,
p=1 or 2,
q=0, 1 or 2,
p+q=1, 2 or 3,
and (2i) optionally at least one siloxyl functional unit of formula:

 (IV.2 b₂)

in which G has the same meaning as above and r has a value of between 0 and 3, for example between 1 and 3.

Compounds (4.2) are preferably epoxyalkoxymonosilanes (IV.2a).

By way of such compounds (IV.2a), mention may be made of:
3-glycidoxypropyltrimethoxysilane (GLYMO), or
3,4-epoxycyclohexylethyltrimethoxysilane.

With regard to compound (4.3), this may consist of, or comprise, a metal chelate. The metal M chosen may thus include one or more ligands, such as those derived especially from β-diketone, such as, for example, acetylacetone. Compound (4.3) may also consist of, or comprise, a metal alkoxide having the formula M(OJ)n defined above, in which the alkoxy radicals are, for example, n-propoxy and n-butoxy radicals. In this formula, it should be noted that one or more alkoxy radicals OJ may be replaced with one or more ligands of which a chelate is composed, such as, for example, an aceteylacetonate ligand.

Preferred compounds (4.3) are those in which the metal M is chosen from the following list: Ti, Zr, Ge, Mn, Al.

It should be pointed out that titanium is particularly preferred.

Specific examples of compounds (4.3) which are very suitable are those in the structure of which the metal M is chosen from the list: Ti, Zr, Se, Mn and Al and is associated:
in the case of a chelate, with acetylacetonate-type ligands
in the case of an alkoxide, with n-propoxy or n-butoxy radicals.

According to the invention, the adhesion promoter (4) may be formed from:
(4.1) alone
(4.2) alone
(4.1)+(4.2)
according to two preferred embodiments:
(4.1)×[sic] (4.3)
(4.2)×[sic] (4.3)
and, finally, according to the most preferred embodiment:
(4.1)+(4.2)+(4.3).

According to the invention, one advantageous combination for forming the adhesion promoter is the following:
vinyltrimethoxysilane (VTMS)/3-glycidoxypropyltrimethoxysilane (GLYMO)/butyl titanate.

When (4.1)+(4.2) are used, the proportions between (4.1) and (4.2), expressed in percentages by weight with respect to the total of the two, are:
(4.1): especially from 5 to 95%, preferably from 30 to 70%
(4.2): especially from 95 to 5%, preferably from 70 to 30%.

When ((4.2)+(4.3) or (4.2)+(4.3) are used, the weight proportions of (4.3) with respect to the total (4.1) or (4.2)+(4.3) are especially from 5 to 25%, preferably from 8 to 18%.

Quantitatively, when (4.1)+(4.2)+(4.3) are used, it may be specified that the weight proportions between (4.1), (4.2) and (4.3), expressed in percentages by weight with respect to the total of the three, are as follows:
(4.1) $\geq$ 10, preferably between 15 and 70 and even more preferably between 25 and 65,
(4.2) $\leq$ 90, preferably between 70 and 15 and even more preferably between 65 and 25,
(4.3) $\geq$ 1, preferably between 5 and 25 and even more preferably between 8 and 18,
it being understood that the sum of these proportions of (4.1), (4.2) and (4.3) is equal to 100%.

Advantageously, the adhesion promoter is present in an amount of from 0.1 to 10, preferably 0.5 to 5 and even more preferably 1 to 4% by weight with respect to all of the constituents of the composition, excluding the microspheres.

In the case where the composition according to the invention contains a resin (5), this is a polyorganosiloxane resin containing at least one alkenyl residue in its structure, and this resin has an alkenyl group(s) weight content of between 0.1 and 20% by weight and preferably between 0.2 and 10% by weight.

These resins are well-known branched organopolysiloxane polymers or oligomers available commercially. They are in the form of solutions, preferably siloxane solutions. They have, in their structure, at least two different functional units selected from those of formula $R_3SiO_{0.5}$ (M functional unit), $R_2SiO$ (D functional unit), $RSiO_{1.5}$ (T functional unit) and $SiO_2$ (Q functional unit), at least one of these functional units being a T or Q functional unit.

The radicals R are the same or different, and are selected from linear or branched $C_1$–$C_6$ alkyl radicals and $C_2$–$C_4$ alkenyl, phenyl, 3,3,3-trifluoropropyl radicals. Mention may be made, for example, of: as alkyl radicals R, methyl, ethyl, isopropyl, tert-butyl and n-hexyl radicals and, as alkenyl radicals R, vinyl radicals.

It should be understood that in the resins (5) of the aforementioned type, some of the radicals R are alkenyl radicals.

As examples of branched organopolysiloxane polymers or oligomers, mention may be made of MQ resins, MDQ resins, TD resins and MDT resins, the alkenyl functional groups possibly being carried by the M, D and/or T functional units. As examples of resins which are particularly well suitable, mention may be made of vinyl MDQ resins having a vinyl-group weight content of between 0.2 and 10% by weight.

This resin has the function of increasing the mechanical strength of the silicone elastomer coating, as well as its adhesion, within the context of coating the sides of a synthetic fabric (for example made of polyamide) stitched in order to form airbags. This structural resin is advantageously present in a concentration of between 10 and 70% by weight with respect to all of the constituents of the composition, excluding the microspheres, preferably between 30 and 60% by weight and even more preferably between 40 and 60% by weight.

The polyorganosiloxane resin (5) will particularly preferably contain at least 2% by weight of $SiO_2$ functional units (Q functional units), in particular from 4 to 14% and preferably from 5% to 12%.

In the case where the composition according to the invention contains a reinforcing filler (5), this may be a silica having a BET specific surface area of at least 50 m²/g. The fillers are advantageously treated, by treatment with the various organosilicon compounds usually employed for this purpose. Thus, these organosilicon compounds may be organochloro-silanes, diorganocyclopolysiloxanes, hexaorganodi-siloxanes, hexaorganodisilazanes or diorganocyclopoly-silazanes (French Patents FR-A-1,126,884, FR-A-1,136,885, FR-A-1,236,505 and British Patent GB-A-1,024,234).

The composition according to the invention may furthermore contain a conventional semi-reinforcing or bulking filler, for example diatomaceous earth or ground quartz.

Other non-silicious mineral materials may be used, such as semireinforcing or bulking mineral fillers: carbon black, titanium dioxide, aluminium oxide, hydrated alumina, expanded vermiculite, unexpanded vermiculite, calcium carbonate, zinc oxide, mica, talc, iron oxide, barium sulphate and slaked lime, etc.

These fillers may be present in an amount from 5 to 30%, preferably from 15 to 25% in the case of reinforcing fillers and from 5 to 40%, preferably from 10 to 30%, in the case of semireinforcing or bulking fillers with respect to the total composition, excluding the microspheres.

The polyorganosiloxane (1) is, weightwise, one of the main constituents of the composition according to the invention. Advantageously, this is a substance containing (i) siloxyl functional units of formula:

$$T_a Z_b SiO_{\frac{4-(a+b)}{2}} \quad (1.1)$$

in which:
T is an alkenyl group, preferably vinyl or allyl,
Z is a monovalent hydrocarbon group, free of any action unfavourable to the activity of the catalyst and selected, preferably, from alkyl groups having from 1 to 8 carbon atoms inclusive, optionally substituted by at least one halogen atom, advantageously, from methyl, ethyl, propyl and 3,3,3-trifluoropropyl groups and as well as from aryl groups and, advantageously, from xylyl, tolyl and phenyl radicals,
a is 1 or 2, b is 0, 1 or 2 and a+b is between 1 and 3, preferably between 2 and 3,
and (2i) optionally other siloxyl functional units of formula:

$$Z_c SiO_{\frac{4-c}{2}} \quad (1.2)$$

in which Z has the same meaning as above and c has a value of between 0 and 3, preferably between 2 and 3.

This polydiorganosiloxane may have a viscosity at least equal to 200 mPa·s and preferably lower than 200,000 mPa·s.

All the viscosities involved in the present document correspond to a dynamic viscosity quantity which is measured, in a manner known per se, at 25° C.

The polyorganosiloxane (1) may be only formed from functional units of formula (1.1) or may contain, in addition, functional units of formula (1.2). Likewise, it may have a linear, branched, cyclic or network structure.

Z is generally selected from methyl, ethyl and phenyl radicals, 60 mol. % (or 60% by number) at least of the radicals Z being methyl radicals.

Examples of siloxyl functional units of formula (1.1) are the vinyldimethylsiloxyl functional unit, the vinylphenylmethylsiloxyl functional unit, the vinylmethylsiloxyl functional unit and the vinylsiloxyl functional unit.

Examples of siloxyl functional units of formula (1.2) are $SiO_{4/2}$, dimethylsiloxyl, methylphenylsiloxyl, diphenylsiloxyl, methylsiloxyl and phenylsiloxyl functional units.

Examples of polyorganosiloxanes (1) are linear and cyclic compounds such as: dimethylvinylsilyl-terminated dimethylpolysiloxanes, trimethylsilyl-terminated (methylvinyl)(dimethyl)-polysiloxane copolymers, dimethylvinylsilyl-terminated (methylvinyl)(dimethyl) polysiloxane copolymers and cyclic methylvinylpolysiloxanes.

The polyorganosiloxane (2) is preferably of the type of those which contain:
(i) siloxyl functional units of formula:

$$H_d L_e SiO_{\frac{4-(d+e)}{2}} \quad (2.1)$$

in which:
L is a monovalent, hydrocarbon group, free of any action unfavourable to the activity of the catalyst and selected, preferably, from alkyl groups having from 1 to 8 carbon atoms inclusive, optionally substituted by at least one halogen atom, advantageously, from methyl, ethyl, propyl and 3,3,3-trifluoropropyl groups, and as well as from aryl groups, and, advantageously, from xylyl, tolyl and phenyl radicals, d is 1 or 2, e is 0, 1 or 2, d+e has a value of between 1 and 3, preferably between 2 and 3, and (2i) optionally other siloxyl functional units of average formula:

$$L_g SiO_{\frac{4-g}{2}} \quad (2.2)$$

in which L has the same meaning as above and g has a value of between 0 and 3, preferably between 2 and 3.

The dynamic viscosity of this polyorganosiloxane (2) is at least equal to 10 mPa·s and preferably is between 20 and 1000 mPa·s.

The polyorganosiloxane (2) may be only formed from functional units of formula (2.1) or may contain, in addition, functional units of formula (2.2).

The polyorganosiloxane (2) may have a linear, branched, cyclic or network structure.

The group L has the same meaning as the group Z above.

Examples of functional units of formula (2.1) are:

$H(CH_3)_2 SiO_{1/2}$, $HCH_3 SiO_{2/2}$, $H(C_6H_5) SiO_{2/2}$

Examples of functional units of formula (2.2) are the same as those given above for the functional units of formula (1.2).

Examples of polyorganosiloxane (2) are linear and cyclic compounds such as:

hydrogenodimethylsilyl-terminated dimethylpolysiloxanes, copolymers containing trimethylsilyl-terminated (dimethyl)(hydrogenomethyl)polysiloxane functional units, copolymers containing hydrogenodimethylsilyl-terminated (dimethyl)(hydrogenomethyl)polysiloxane functional units, trimethylsilyl-terminated hydrogenomethyl-polysiloxanes, and cyclic hydrogenomethylpolysiloxanes.

The compound (2) may possibly be a mixture of a dimethylpolysiloxane having hydrogenodimethylsilyl terminal groups and of a polyorganosiloxane carrying at least 3 ≡SiH functional groups.

The ratio of the number of hydrogen atoms linked to the silicon in the polyorganosiloxane (2) to the total number of groups having alkenyl unsaturation in the polyorganosiloxane (1) and in the resin (5) is between 0.4 and 10, preferably between 0.6 and 5.

The polyaddition silicone composition bases may contain only linear polyorganosiloxanes (1) and (2) such as, for example, those described in U.S. Pat. No. 3,220,972, U.S. Pat. No. 3,697,473 and U.S. Pat. No. 4,340,709, or may contain both branched or network polyorganosiloxanes (1) and (2) such as, for example, those described in U.S. Pat. No. 3,284,406 and U.S. Pat. No. 3,434,366.

According to a specific embodiment, the following are employed:

at least one linear polyorganosiloxane (1) containing chains formed from functional units of formula (1.2) in which c=2, these being blocked at each of their ends by functional units of formula (1.1) in which a=1 and b=2, end at least one linear polyorganosiloxane (2) containing in its structure at least three hydrogen atoms linked to the silicon, these being located in the chains and/or chain ends; and more particularly still:

at least one linear polyorganosiloxane (1) containing chains formed from functional units of formula (1.2) in which c=2, these being blocked at each of their ends by functional units of formula (1.1) in which a=1 and b=2, and at least one linear polyorganosiloxane (2) containing chains formed from functional units of formula (2.1) in which d=1 and e=1 and, optionally, functional units of formula (2.2) in which g=2, these being blocked at each of their ends by functional units of formula (2.1) in which d=1 and e=2.

The catalysts (3) are also well-known. The metals of the platinum group are those known as platinoids, which name covers, apart from platinum, ruthenium, rhodium, palladium, osmium and iridium. Preferably, platinum and rhodium compounds are used. In particular, it is possible to use complexes of platinum and of an organic substance described in U.S. Pat. No. 3,159,601, U.S. Pat. No. 3,159,602, U.S. Pat. No. 3,220,972 and European Patents EP-A-0,057,459, EP-A-0,188,978 and EP-A-0,190,530 and the complexes of platinum and of the vinyl organosiloxanes described in U.S. Pat. No. 3,419,593, U.S. Pat. No. 3,715,334, U.S. Pat. No. 3,377,432 and U.S. Pat. No. 3,814,730. The catalyst generally preferred is platinum. In this case, the amount by weight of catalyst (3), calculated in terms of the weight of platinum metal, is generally between 2 and 400 ppm, and preferably between 5 and 200 ppm, these being based on the total weight of the polyorganosiloxanes (1) and (2).

Advantageously, the silicone composition according to the invention may also include at least one addition-reaction retarder (6) (crosslinking inhibitor) selected from the following compounds:

polyorganosiloxanes substituted with at least one alkenyl which may optionally be in cyclic form, tetramethylvinyltetrasiloxane being particularly preferred, pyridine, organic phosphines and phosphites, unsaturated amides, alkyl maleates, and alkynyl alcohols.

These alkynyl alcohols (cf. FR-B-1,528,464 and FR-A-2,372,874), which form part of the preferred thermal hydrosilylation-reaction blockers, have the formula:

$$R'—(R")C(OH)—C≡CH$$

in which formula:

R' is a linear or branched alkyl radical or a phenyl radical;

R" is H or a linear or branched alkyl radical or a phenyl radical, it being possible for the radicals R', R" and the carbon atom in the α position with respect to the triple bond optionally to form a ring;

the total number of carbon atoms contained in R' and R" being at least 5, preferably from 9 to 20.

The said alcohols are preferably selected from those having a boiling point greater than 250° C. By way of examples, mention may be made of:

1-ethynyl-1-cyclohexanol;

3-methyl-1-dodecyn-3-ol;

3,7,11-trimethyl-1-dodecyn-3-ol;

1,1-diphenyl-2-propyn-1-ol;

3-ethyl-6-ethyl-1-nonyn-3-ol;

2-methyl-3-butyn-2-ol; and
3-methyl-1-pentadecyn-3-ol.

These α-alkynyl alcohols are commercially available products.

Such a retarder (6) is present in an amount of at most 3000 ppm, preferably in an amount of from 100 to 1000 ppm with respect to the total weight of the organopolysiloxanes (1) and (2).

The presence of such compounds (6) is particularly important when, according to a preferred embodiment of the invention, expandable microspheres are used. It may in fact be judicious to adjust the hot crosslinking of the elastomer so as to allow time for the microspheres to expand.

In a manner known per se, various conventional additives, such as colorants for example, may be added to the silicone elastomer composition.

According to another of these aspects, the present invention relates to a two-component precursor system for the silicone composition described hereinabove. Such a precursor system is in the form of two separate parts A and B, these being intended to be mixed together to form the composition, one of these parts A or B containing the catalyst (3) and only one of the species, (1) or (2), of polyorganosiloxane.

Yet another characteristic of this precursor system is that the resin (5), when it is used, may be employed in part A or part B or in both parts A and B and that the catalyst (3) must not be present in the part A or B which contains the polyorganosiloxane (2) and the resin (5).

In the case of the promoter system (4.1) (4.2) (4.3), another characteristic of this precursor system is that its part A or B containing the polyorganosiloxane (2) does not contain compounds (4.3) of the promoter (4) and that its part A or B which includes the compound (4.1) of the promoter (4) does not comprise the catalyst (3).

The compound (7) may be present in one or both parts A and B. It is also possible to add it after mixing parts A and B together.

The viscosity of parts A and B and of their mixture together or with the microspheres may be adjusted by varying the amounts of the constituents and by selecting polyorganosiloxanes of different viscosity.

Once parts A and B have been mixed together, they form a ready-to-use composition (RTV II) silicone, which may be applied to the substrate by any suitable coating means (for example a doctor blade or roller).

In general, the aim will be to have a final deposited thickness, after crosslinking and expansion, of between 25 and 300 µm, especially between 50 and 200 µm.

Although the polyaddition composition in itself, applied to the substrate to be coated, is able to crosslink cold (i.e. at a temperature close to room temperature, =23° C.), it should be noted that the compositions according to the invention may also be crosslinked thermally and/or by electromagnetic radiation (electron beam).

When the composition according to the invention contains expanded microspheres, the crosslinking may, as required, be carried out cold or, preferably, by the means which have just been described.

When the composition according to the invention contains expandable microspheres, the crosslinking and the expansion are advantageously carried out by heating the composition applied to the substrate. Depending on the characteristics of the microspheres and of the silicone composition, a heating temperature and heating time will be chosen which are compatible with suitable expansion of the microspheres before the silicone is cured. Preferably, the operating conditions may be: heating between 80 and 170° C., particularly between 100 and 160° C., for 1 to 5 minutes, particularly from 1 to 3 minutes.

The compositions according to the invention may be used for covering or coating flexible substrates, in particular woven, knitted or non-woven fibrous textiles and, preferably, woven, knitted or non-woven substrates made of synthetic fibres, advantageously polyester or polyamide fibres.

The compositions according to the invention, compared with the same compositions without microspheres give the coated substrate in particular the following advantages:

reduction in the coefficient of friction, especially by a fact or of at least 2;

sensation of a dry, non-sticky feel;

reduction in the manufacturing cost;

and, for the same deposited weight:

greater thickness, increased thermal protection.

The invention relates, in particular to the covering or coating of at least one of the sides of the flexible substrate, in particular textile material (polyamide fabric, for example) used for manufacturing specialty fabrics such as, in particular, vehicle airbags, tent canvas, parachute cloth and the like.

Within this context, the compositions according to the invention prove to be noteworthy not only for coating substrates conventionally used in particular in manufacturing airbags but also for coating substrates having an open construction. Substrate having an open construction is understood to mean substrates having a porosity>15 l/dm$^2$/min according to the DIN 53 887 standard. In the case of a fabric, the open construction may in particular be defined as corresponding to a number of warp and weft yarns per centimetre, the sum of which is less than or equal to 36.

As fabric s particularly recommended within the scope of the present invention, mention may be made in general of fabrics whose weight in the uncoated state is less than 200 g/m$^2$ and especially less than or equal to 160 g/m$^2$. Thus, mention may be made of such fabrics, especially polyamide fabrics, having from 16×16 to 18×18 yarns/cm, for example 470 dtex (decitex) fabrics having these characteristics.

It will be not ed that it will also be possible to use substrates, especially fabrics, formed from high-performance textile fibres, that is to say textile fibres having enhanced properties with respect to conventional fibres, for example increased tenacity, so as to confer particular or enhanced properties depending on the applications of the coated substrate or fabric.

For coating substrates having an open construction, compositions are preferably used which contain the oil (1) having a viscosity of between 10,000 and 200,000 mPa·s, especially between 30,000 and 170,000, in particular between 40,000 and 120,000, and resin (5) containing Q functional units, especially at least 2% by weight of such functional units, in particular from 4 to 14% and preferably from 5% to 12%.

The subject of the invention is therefore also such a flexible, in particular textile, substrate coated according to the invention and therefore able to exhibit the characteristics and properties indicated above.

By virtue of the properties and characteristics indicated above, it is possible to produce airbags for the individual protection of the occupants of a vehicle based on fabrics having an open construction as described hereinabove, in particular polyamide or polyester fabrics, which, once

13 coated, have a weight of less than or equal to 200 g/m² and possessing, moreover, optimum properties, especially impermeability, tear resistance, thermal protection, porosity and pliability. This makes it possible to produce airbags which are lighter with an even coating thickness, have higher performance and are less expensive than bags produced from coated fabrics of the prior art. It is also possible, for the same weight, to increase the coating thickness and improve the impermeability, the thermal protection and the tear resistance.

In general, the coating involved here may correspond to depositing a single layer on at least one of the sides of the flexible substrate material (primary coat). However, it may also involve depositing a second layer or optionally a third layer on at least one of the sides of the substrate material already coated (secondary coat) in order to have in total the desired thickness which guarantees the best possible performance characteristics in terms of impermeability and favourable feel characteristics.

The following examples, of preparation of the composition and of its application as a covering for a polyamide fabric, will enable the invention to be more clearly understood and will enable its advantages and its alternative embodiments to be apparent. The performance characteristics of the composition of the invention will be demonstrated below by comparative tests.

EXAMPLES

In these examples, the viscosity is measured using a BROOKFIELD viscometer according to the information in the AFNOR NFT 76 106 standard of May 1982.

Example 1

Example of the Preparation of Compositions
1.—Preparation of an Unfilled Silicone Composition According to the Invention (Composition C1):
   1.1—Preparation of Part A of the Two-component System:
   The following are mixed in a reactor, at room temperature:

48 parts by weight of resin (5) having a $MM^{Vi}DD^{Vi}Q$ structure containing 0.8% by weight of vinyl groups (Vi) and consisting of 27% by weight of $(CH_3)_3SiO_{0.5}$ functional units, 0.15% by weight of $(CH_3)_2ViSiO_{0.5}$ functional units, 60% by weight of $(CH_3)_2SiO$ functional units, 2.4% by weight of $(CH_3)ViSiO$ functional units and 9.6% by weight of $SiO_2$ functional units [this constituent being called resin (5) hereafter];

45 parts by weight of a polyorganosiloxane (1) consisting of a polydimethylsiloxane oil terminated at each of the chain ends by a $(CH_3)_2ViSiO_{0.5}$ functional unit, having a viscosity of 100,000 mPa·s and containing 0.003 Vi—Si functional groups per 100 g of oil [this constituent being called hereafter oil (1)];

5 parts by weight of a polyorganosiloxane (2) consisting of a poly(dimethyl)(hydrogenomethyl)-siloxane oil terminated at each of the chain ends by a $(CH_3)_2HSiO_{0.5}$ functional unit, having a viscosity of 25 mPa·s and containing in total 0.7 H—Si functional groups per 100 g of oil (of which 0.6 H—Si functional groups lie within the chain) [this constituent being called hereafter oil (2)];

0.025 parts by weight of inhibitor (6) consisting of ethylcyclohexanol [this constituent being called hereafter inhibitor (6)];

14

1 part by weight of compound (4.1) of the promoter (4), consisting of vinyltrimethoxysilane [this constituent being called hereafter VTMS (4.1)];
   1 part by weight of compound (4.2) of the promoter (4), consisting of 3-glycidoxypropyltrimethoxysilane [this constituent being called hereafter GLYMO (4.2)].
   1.2—Preparation of Part B of the Two-component System:
   The following are mixed in a reactor at room temperature:
   45 parts by weight of resin (5);
   51 parts by weight of oil (1);
   0.6 parts by weight of a colorant base, based on bromophthal blue referenced 4 GNP, sold by the company CIBA GEIGY [this constituent being called hereafter colorant base];
   0.0215 parts by weight of platinum metal, introduced in the form of an organometallic complex containing 12% by weight of platinum metal, known by the name Karstedt catalyst [this constituent being called hereafter platinum of the catalyst (3)]; and
   4 parts by weight of compound (4.3) of the promoter (4), consisting of butyl titanate $Ti(OBu)_4$ [this constituent being called hereafter $Ti(OBu)_4$ (4.3)].
   1.3—Preparation of the Two-component System:
   The two-component system is obtained by mixing, at room temperature, 100 parts by weight of part A and 10 parts by weight of part B.

Next, Expancel® 053 DU microspheres (Nobel) are added to the mixture in an amount of:
   0, 1, 3 and 5 parts per 100 parts of the mixture A+B, in order to give coating compositions called, respectively
   C1 (0)
   C1 (1)
   C1 (3)
   C1 (5).

Characteristics of the microspheres:
acrylonitrile shell containing isobutane
initial diameter=approximately 10 μm. Crosslinking of the composition=160° C., 2 minutes.

| Product reference | Add-on weight (g/m²) | Friction coefficient (Ks) | Pane test(s) | Feel (appreciation) | Additional thickness on top of the fabric |
|---|---|---|---|---|---|
| C1 (0) | 60 | 1.2 | >10 | Sticky | 0 |
| C1 (1) | 61 | 1.8 | >10 | Sticky | — |
| C1 (3) | 61 | 1.3 | ≈5 | Dry | — |
| C1 (5) | 61 | 0.8 | <2 | Very dry | 75 |

Measurement of the friction coefficient=NFQ03082 standard

Pane test: the fabric is placed with its coated side against a vertical pane and the time taken by the fabric to spontaneously disbond and fall off is measured.

What is claimed is:
1. Coating composition which is cold-curing, comprising, as a mixture:
   (1) at least one polyorganosiloxane having, per molecule, at least two $C_2$–$C_6$ alkenyl groups linked to the silicon,
   (2) at least one polyorganosiloxane having, per molecule, at least two hydrogen atoms linked to the silicon,
   (3) a catalytically effective amount of at least one catalyst, composed of at least one metal belonging to the platinum group,

(4) an adhesion promoter comprising
at least one of the following compounds (4.1) and (4.2):
(4.1) at least one optionally alkoxylated organosilane containing, per molecule, at least one $C_2$–$C_6$ alkenyl group,
(4.2) at least one organosilicon compound which includes at least one epoxy radical;
with optionally in addition:
(4.3) at least one metal M chelate and/or one metal alkoxide of the formula: $(M(OJ)_n)$, where n=the valency of M and J=a linear or branched $C_1$–$C_8$ alkyl,
M being selected from the group formed by: Ti, Zr, Ge, Li, Mn, Fe, Al or Mg,
(5) optionally, a reinforcing system, which may be at least one polyorganosiloxane resin, and/or at least one reinforcing filler,
(6) optionally, at least one crosslinking inhibitor, and
(7) expandable organic hollow microspheres having a polymer wall containing a liquid or a gas.

2. Composition according to claim 1, wherein the microspheres have a wall comprising polymers or copolymers prepared from vinyl chloride, vinylidene chloride, acrylonitrile, methyl methacrylate or strene monomers, or of blends of polymers and/or copolymers.

3. Composition according to claim 1, characterized in that the microspheres have an inorganic coating.

4. Composition according to claim 1, wherein the microspheres have a diameter after expansion of between 10 and 150 µm.

5. Composition according to claim 1, wherein, before expansion, the microspheres have a diameter of between 3 and 50 µm.

6. Composition according to claim 1, wherein the microspheres are present in an amount from 1 to 30% by weight, with respect to the total composition.

7. Composition according to claim 1, wherein the optionally alkoxylated organosiloxane (4.1) satisfies the following general formula:

$$R^1R^2C{=}C(R^3)-(U)_{x'}-W-Si(R^4)_x(OR^5)_{3-x} \tag{4.1}$$

in which:
$R^1$, $R^2$, $R^3$ are hydrogen-containing or hydrocarbon radicals, which are the same or different from each other and represent hydrogen, a linear or branched $C_1$–$C_4$ alkyl or a phenyl optionally substituted with at least one $C_1$–$C_3$ alkyl,
U is a linear or branched $C_1$–$C_4$ alkylene, or a divalent group of formula —COO-alkylene-, in which the alkylene residue is as defined above and is linked to the Si via W,
W is a valency bond,
$R^4$ and $R^5$ are radicals, which are the same or different and represent a linear or branched $C_1$–$C_4$ alkyl,
x'=0 or 1, and
x=0 to 2.

8. Composition according to claim 1, wherein the organosilicon compound (4.2) is selected:
either from the substances (4.2a) satisfying the following general formula:

$$(R^6O)_{3-y}Si(R^7)_y-X \tag{4.2a}$$

in which:
$R^6$ is a linear or branched $C_1$–$C_4$ alkyl radical,
$R^7$ is a linear or branched alkyl radical,
y is equal to 0, 1, 2 or 3, $$X = -E(O-D)_z-CR^8-CR^9R^{10} \text{ (epoxide)}$$

with
E and D, which are the same or different radicals, selected from linear or branched $C_1$–$C_4$ alkyls,
z, which is equal to 0 or 1,
$R^8$, $R^9$, $R^{10}$, which are the same or different radicals, representing hydrogen or a linear or branched $C_1$–$C_4$ alkyl,
or from the substances (4.2b) consisting of epoxyfunctional polydiorganosiloxanes comprising:
(i) at least one siloxyl functional unit of formula:

$$X_p G_q SiO_{\frac{4-(p+q)}{2}} \tag{IV.2 b_1}$$

in which:
X is the radical as defined above in the case of formula (IV.2a)
G is a monovalent hydrocarbon group, free of any action unfavourable to the activity of the catalyst and selected from the alkyl groups having from 1 to 8 carbon atoms inclusive, optionally substituted by at least one halogen atom, and as well as from the aryl groups,
p=1 or 2,
q=0, 1 or 2,
p+q=1, 2 or 3,
and (2i) optionally at least one siloxyl functional unit of formula:

$$G_r SiO_{\frac{4-r}{2}} \tag{IV.2 b_2}$$

in which G has the same meaning as above and r has a value of between 0 and 3.

9. Composition according to claim 1, wherein the metal chelate (4.3) comprises one or more ligands derived from a β-diketone.

10. Composition according to claim 1, wherein the alkoxy radical of the metal alkoxide (4.3) is an n-butoxy or an n-propoxy.

11. Composition according to claim 1, wherein the metal M of the chelate and/or of the alkoxide (4.3) is selected from the following list: Ti, Zr, Ge, Al, Mn.

12. Composition according to claim 1, wherein the promoter (4) comprises the compounds (4.1), (4.2) and (4.3) and in that the weight proportions between (4.1), (4.2) and (4.3), expressed in percentages by weight with respect to the total of the three, are as follows:
(4.1) is between 15 and 70,
(4.2) is between 70 and 15,
(4.3) is between 5 and 25;
and in that the weight ratio (4.2):(4.1) is between 2:1 and 0.5:1.

13. Composition according to claim 1, wherein the adhesion promoter is present in an amount of from 0.1 to 10% by weight with respect to all of the constituents, excluding the microspheres.

14. Composition according to claim 1, wherein the reinforcing system comprises polyorganosiloxane resin (5) which contains, in its structure, from 0.1 to 20% by weight of an alkenyl group or groups, said structure having at least two different functional units selected from the functional units of the M, D, T and Q types, at least one of these functional units being a functional unit of the T or Q type.

15. Composition according to claim 1, wherein the resin (5) is present in an amount of from 10 to 70% by weight with respect to all of the constituents.

16. Composition according to claim 1, wherein the reinforcing system comprises a silica reinforcing filler comprising.

17. Composition according to any one of claim 1 to 16, characterized in that it comprises a semireinforcing or bulking filler.

18. Composition according to claim 1, wherein the polyorganosiloxane (1) has:

(i) siloxyl functional units of formula:

 (1.1)

in which:
T is an alkenyl groups,
Z is a monovalent hydrocarbon group, free of any action unfavourable to the activity of the catalyst and selected from alkyl groups having from 1 to 8 carbon atoms inclusive, optionally substituted by at least one halogen atom, and as well as from aryl groups,
a is 1 or 2, b is 0, 1 or 2 and a+b is between 1 and 3, and (2i) optionally other siloxyl functional units of formula:

 (1.2)

in which Z has the same meaning as above and c has a value of between 0 and 3.

19. Composition according to claim 1, characterized in that the polyorganosiloxane (2) contains (i) siloxyl functional units of formula:

 (2.1)

in which:

L is a monovalent hydrocarbon group, free of any action unfavourable to the activity of the catalyst and selected from alkyl groups having from 1 to 8 carbon atoms inclusive, optionally substituted by at least one halogen atom, and as well as from aryl groups,
d is 1 or 2, e is 0, 1 or 2, d+e has a value of between 1 and 3, and (2i) optionally other siloxyl functional units of average formula:

 (2.2)

in which L has the same meaning as above and g has a value of between 0 and 3.

20. Composition according to claim 1, wherein the proportions of (1), (2) and (5) are such that the ratio of the number of hydrogen atoms linked to the silicon in the polyorganosiloxane (2) to the number of alkenyl radicals provided by the polyorganosiloxane (1) and the resin (5) is between 0.4 and 10.

21. Composition according to claim 1, wherein the polyorganosiloxane (1) has a viscosity of greater than 1000 mPa·s at 25° C.

22. Two-component system, a precursor of the composition according to claim 1, wherein:
it is in the form of two separate parts A and B, these being intended to be mixed together to form the composition, and in that one of these parts A and B contains the catalyst (3) and only on the species, (1) or (2), of polyorganosiloxane and the other part contains the polyorganosiloxane (1) or (2) not present with the catalyst (3).

23. Flexible substrate, comprising a woven, knitted or non-woven fibrous textile, coated on one or both sides with a composition according to claim 1.

24. Coated substrate according to claim 23, wherein the fibrous substrate is a fabric having an open construction and a porosity>15 l/dm²/min according to the DIN 53 887 standard.

25. Airbag for protecting an occupant of a vehicle, formed from a coated fabric according to claim 23.

26. Composition according to claim 1, wherein the expandable microspheres are present in an amount of 3 to 30% by wt. of the total composition.

27. A coating composition according to claim 1, wherein the adhesion promoter comprises the compounds (4.1) and (4.2) or the compounds (4.1) and (4.3) or the compounds (4.2) and (4.3).

* * * * *